March 23, 1937. W. C. GRAVES, JR 2,074,902
AUTOMATIC VEHICLE CONTROLLING APPARATUS
Filed Aug. 10, 1936  4 Sheets-Sheet 1
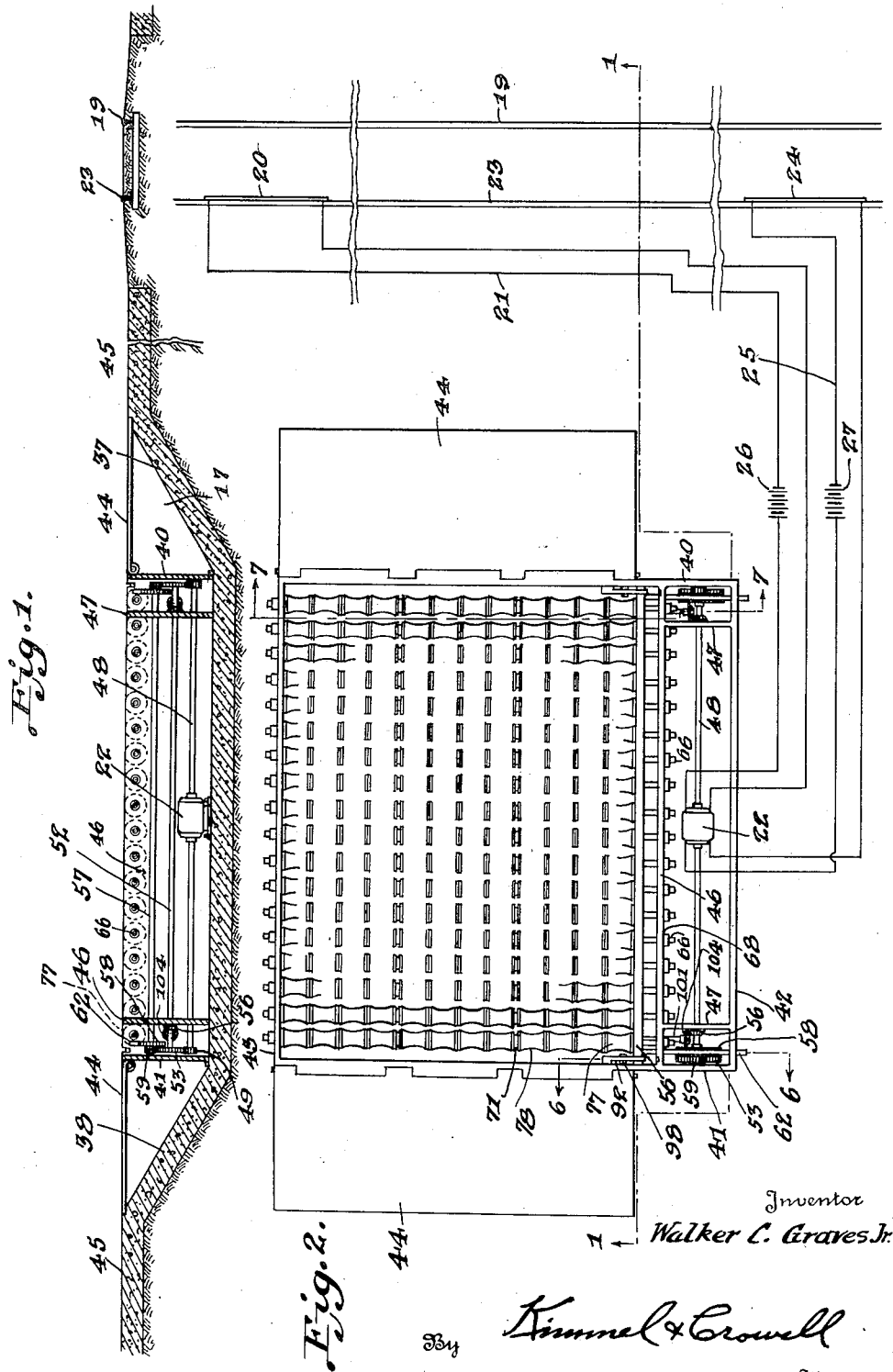

March 23, 1937. W. C. GRAVES, JR 2,074,902
AUTOMATIC VEHICLE CONTROLLING APPARATUS
Filed Aug. 10, 1936 4 Sheets-Sheet 2
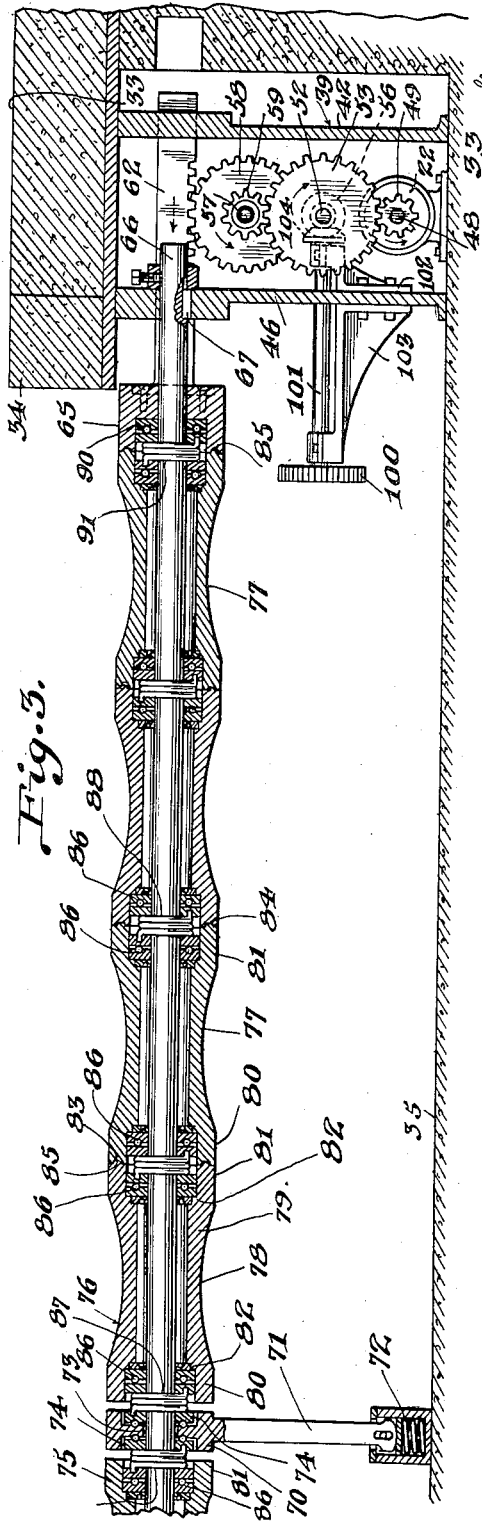
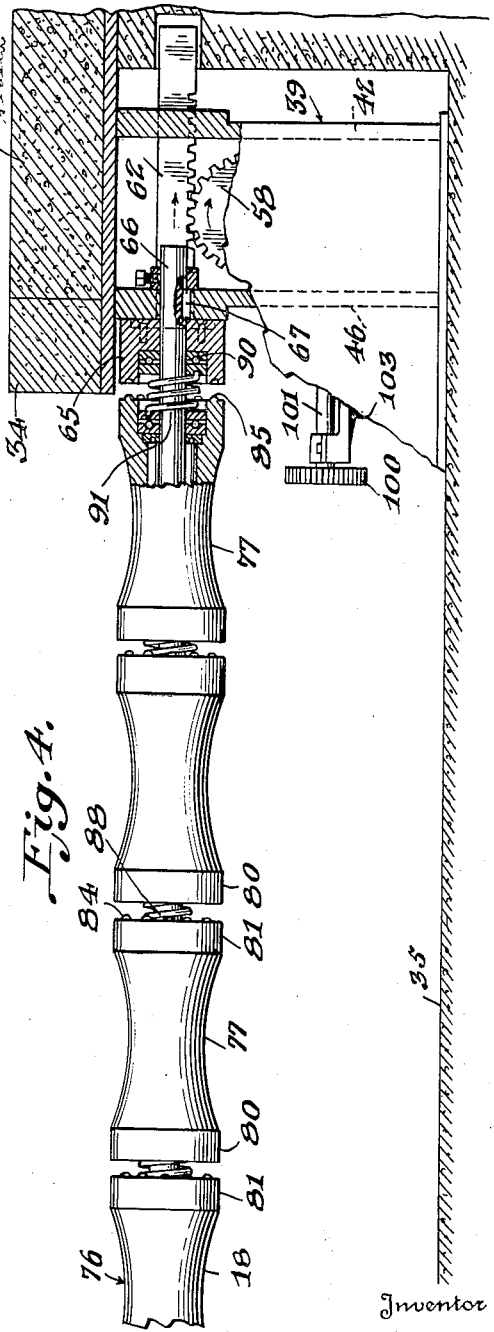
Inventor
Walker C. Graves Jr.
By Kimmel & Crowell
Attorneys March 23, 1937. W. C. GRAVES, JR 2,074,902
AUTOMATIC VEHICLE CONTROLLING APPARATUS
Filed Aug. 10, 1936 4 Sheets-Sheet 3
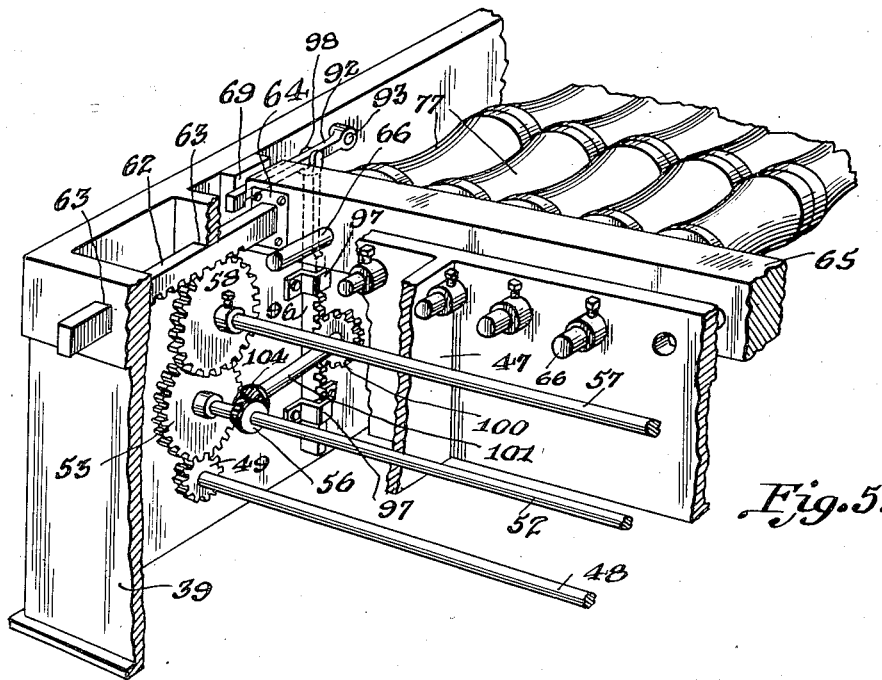
Inventor
Walker C. Graves Jr.
By Kimmel & Crowell
Attorneys

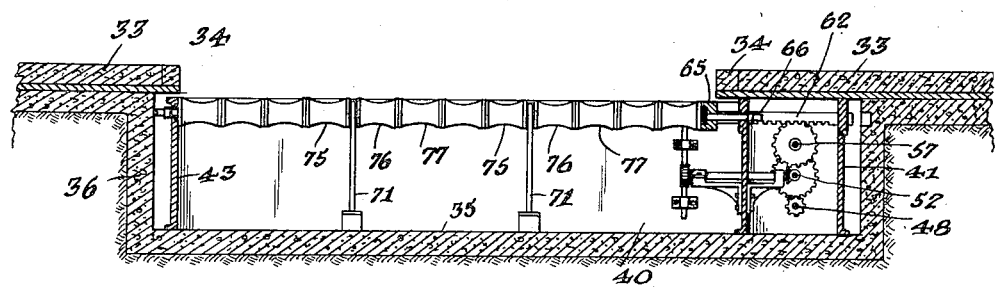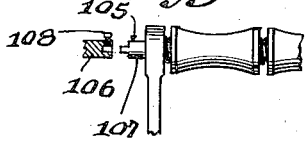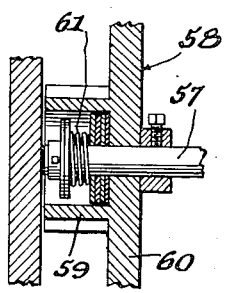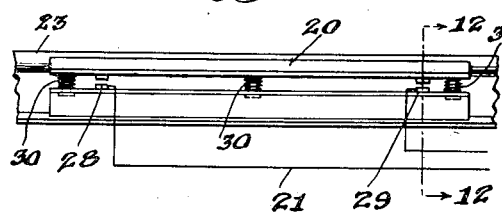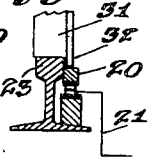

Patented Mar. 23, 1937

2,074,902

UNITED STATES PATENT OFFICE 2,074,902

AUTOMATIC VEHICLE CONTROLLING APPARATUS

Walker Coleman Graves, Jr., San Francisco, Calif.

Application August 10, 1936, Serial No. 95,290

7 Claims. (Cl. 246—125)

This invention relates to an automotive vehicle controlling apparatus designed primarily for use at railroad crossings, but it is to be understood that an apparatus, in accordance with this invention, may be employed in any connection for which it is found applicable.

The invention has for its object to provide, in a manner as hereinafter set forth, means, under the control of a railroad train approaching a crossing or intersection, for arresting the traction of a vehicle to stop the latter adjacent to and as it is traveling in a direction towards the crossing or intersection thereby reducing accidents to a minimum.

A further object of the invention is to provide, in a manner as hereinafter set forth, an apparatus of the class referred to including means, under the control of a railroad train for automatically stopping a traveling vehicle adjacent to an intersection between a railroad track and a road or street, and with the stopping of the vehicle constituting a warning to the driver of the vehicle that a railroad train is approaching the intersection.

A further object of the invention is to provide, in a manner as hereinafter set forth, an apparatus of the class referred to, made active by a railroad train when approaching a crossing for stopping a vehicle when the latter is traveling in a direction towards the crossing.

A further object of the invention is to provide, in a manner as hereinafter set forth, means to prevent a vehicle traveling over a railroad crossing or intersection when a train is traveling towards such crossing.

A further object of the invention is to provide, in a manner as hereinafter set forth, means controlled by a train approaching a crossing to prevent a vehicle traveling over the latter thereby reducing possibility of collisions to a minimum.

A further object of the invention is to provide, in a manner as hereinafter set forth, means for arresting the travel of a vehicle adjacent to a railroad crossing to prevent accidents and to constitute a warning that a railroad train is approaching and will pass over the crossing.

Further objects of the invention are to provide, in a manner as hereinafter set forth, a vehicle controlling apparatus which is comparatively simple in its construction and arrangement, strong, durable, readily installed with respect to a railroad crossing, automatic in its action, thoroughly efficient for the purpose intended thereby, and comparatively inexpensive with respect to underground tunneling.

With the foregoing and other objects which may hereinafter appear, the invention consists of the novel construction, combination and arrangement of parts as will be more specifically referred to and are as illustrated in the accompanying drawings wherein is shown an embodiment of the invention, but it is to be understood that changes, variations and modifications may be resorted to which fall within the scope of the invention as claimed.

In the drawings:—

Figure 1 is a section on line 1—1, Figure 2 illustrating one of the combined vehicle stop and releasing structures of the apparatus installed in a roadway or street adjacent to one side of a railroad crossing, Figure 2 is a top plan view of the structural arrangement shown in Figure 1, Figure 3 is a fragmentary view in vertical section of the combined vehicle stop and releasing structure and with the latter in released position, Figure 4 is a fragmentary view partly in elevation and partly in section and showing the parts disclosed in Figure 3 with the stop and releasing structure in stopping position for the vehicle, Figure 5 is a fragmentary view in perspective of the combined stop and releasing structures for the vehicle, Figure 6 is a section on line 6—6, Figure 2, Figure 7 is a section on line 7—7, Figure 2, Figure 8 is a fragmentary view in elevation illustrating a modified form of shaft member of a controlling structure, Figure 9 is a longitudinal sectional view illustrating a railroad crossing and the arrangement of the combined stop and releasing structures of the apparatus relative to said crossing, Figure 10 is a sectional detail of the apparatus, Figure 11 is an elevation of the form of circuit opening and closing device employed for the driving motor of the apparatus, and Figure 12 is a section on line 12—12, Figure 11.

The apparatus will include a pair of combined vehicle stop and releasing structures and each of which will be referred to hereinafter as a vehicle traction controlling structure. Each controlling structure will be located in a street or roadway the desired distance adjacent to one side of a railroad crossing. Each of these controlling structures is preferably spaced a sufficient distance from the railroad that a vehicle passing over the structure can be safely braked before reaching the crossing. If desired a controlling structure may correspond in width to or less than the width of the street or roadway. If of less width than the street or roadway, it will be located on the right side of the latter. Each controlling structure is normally latched in traction position for the automotive vehicle and constitutes a traction surface for the latter. When a controlling structure is released it provides a means to prevent the traction of the automotive vehicle as it approaches a crossing thereby stopping the vehicle and when the vehicle is stopped it will indicate to the driver of the vehicle that a railroad train is approaching the crossing. The controlling structure acts as a means to stop the vehicle a sufficient distance from the crossing and it will function, when released, to prevent the vehicle from being driven over the crossing. The controlling structure is shifted by a mechanism to released position under the control of the railroad train as the latter approaches the crossing and is shifted to latched position by said mechanism under the control of a railroad train as it leaves the crossing. That is to say, as the railroad train approaches a crossing, a controlling structure will be released to constitute a stop for a vehicle and when the train passes from the crossing the controlling structure will be latched to constitute a traction surface whereby the automotive vehicle will be enabled to travel forwardly and pass over the crossing.

The controlling structures are indicated generally at 13, 14 and are of like form. The description of one controlling structure will apply to the other.

With reference to Figure 9, a railroad crossing is indicated at 15 and a road or street which intersects the crossing 15 is indicated at 16. Adjacent to one side of the crossing 15, at the distance desired the road 16 is formed with a cavity 17 in which is arranged the structure 13. The top of the latter is flush with the surface of the road 16. Adjacent to the other side of the crossing 15 at the desired distance, the road is provided with a cavity 18 in which is arranged the structure 14. The top of the latter is flush with the surface of the road 16.

With reference to Figure 2, a railroad track is indicated at 19 and arranged relative to one of the rails of the track 19, at the distance desired from the railroad crossing 15, is a circuit opening and closing member 20. The latter is employed for closing a power circuit 21 for a motor 22. When the circuit 21 is closed the motor 22 is driven in the direction for operating means to be hereinafter referred to, to release a controlling structure. The member 20 is moved to circuit closing position by the flange of a wheel of a train approaching a crossing. The track rail with which the member 20 is arranged relative to is indicated at 23. There is arranged relative to rail 23 the desired distance from the crossing 15 a circuit opening and closing member 24 which functions to open and close circuit 25 which leads to the motor 22 and when circuit 25 is closed the motor 22 is operated in the direction to actuate the means aforesaid to latch the controlling structure. As before stated when a controlling structure is latched it provides a traction surface for an automotive vehicle as it travels towards the crossing, but when the controlling structure is released it prevents traction and stops the vehicle. The member 20 is operated to close the circuit 21 as the train approaches the crossing. The member 24 is actuated to close the circuit 25 after the train passes the crossing. Circuits 21, 25 are motor driving circuits and electrical sources for such circuits are indicated at 26, 27, respectively.

With reference to Figure 11, each of said circuits has interposed therein a pair of spaced contacts 28, 29 which are bridged by a circuit opening and closing member when the latter is depressed. The circuit opening and closing member is resiliently supported as indicated at 30, Figure 11. In Figure 11, the circuit opening and closing member is indicated at 20 and the circuit which that member controls as indicated at 21. In Figure 12, which shows a circuit opening and closing member, the said member is indicated at 20, a wheel of a railroad train is indicated at 31 and the flange of the latter at 32. In Figure 12 the circuit which is controlled by member 20 is indicated at 21 and is to be arranged underground when leading to the motor 22. This statement also applies to the circuit 25. The motor 22 is arranged in a controlling structure and in this connection attention is directed to Figure 2. Preferably the members 20, 24 will be arranged fifteen or more miles from the crossing.

With reference to Figures 3, 4 and 7, the road or street 16 is shown as provided with sidewalks 33 and curbings 34. Cavities 17 and 18 extend under the sidewalks 33. The walls and bottoms of the cavities are formed from concrete as shown in Figures 1 and 7. The bottom 35 of each cavity is flat, the side walls 36 are straight and vertically disposed and the leading and follower walls 37 and 38 (Figure 1) are oppositely outwardly inclined. The concrete employed for the walls and bottoms of the cavities is extended in a manner to form a part of the surface of the road or street (Figures 1 and 2).

Each of the controlling structures comprises a frame 39 disposed upon and secured to the bottom 35 of the cavity. The frame 39 is spaced from the walls of the cavity. The front and rear of the frame 39 are indicated respectively at 40 and 41. The sides of the frame 39 are indicated at 42, 43. Hinged to the top of the front and rear of the frame 39 are plates 44 which seat in the extended portions 45 of the material which provides the wall and bottom of a cavity. The plates 44 permit of access being had to the cavity.

Integral with the inner faces of the front and rear of the frame 39 is a vertically disposed partition 46 which is spaced from the frame side 42. The partition 46 constitutes a support and is connected with frame side 42 by a pair of spaced vertically disposed integral webs 47 arranged in spaced relation relative to the front and rear 40, 41 respectively of frame 39.

The motor 22 is also disposed between the webs 47. The shaft of the motor 22 is indicated at 48 and extends laterally in opposite directions from the motor 22 and also is journaled in the webs 47. Each end of shaft 48 is provided with a pinion 49. Journaled in the webs and positioned above shaft 48 is a shaft 52 having connected to each end thereof a gear 53. The shaft 52 in proximity to the gears 53 are provided with pinions 56. Arranged above the shaft 52 and journaled in the webs 47 is a shaft 57 having resiliently clutched to the ends thereof power transmitting elements 58 and each is in the form of a combined pinion and gear. The pinion of each element 58 is indicated at 59 and the gear at 60. The pinion 59 is on the outer face of the gear. The resilient clutching means for the element 58 is indicated at 61 (Figure 10). The said means 61 provides for slippage of the elements 58 when desired. The elements 58 constitute operating means for shifting toothed arms constituting racks to be referred to. When the pinions 59 are driven the gears 60 are carried therewith.

The racks which are driven from the elements 58 are indicated at 62, are arranged over and mesh with gears 60 and are positioned in proximity to the front and rear of the frame 39. The partition 46 and the side 42 of frame 39 are formed adjacent each end with aligning openings 63 in which the racks 62 are slidably mounted. The racks 62 at their inner ends are anchored as at 64 to a push bar 65 disposed parallel to the partition 46.

Mounted in the side 43 of the frame 39 and of a length to extend through the push bar 65 and the partition 46 is a series of spaced parallel supporting shafts 66 which are keyed, as at 67 (Figures 3 and 4) to the partition 46. The ends of the shafts 66 carry hold-fast devices 68 which abut the side 43 of the frame 39 and the partition 46. The shafts 66 are keyed to the partition 46 to prevent the turning thereof. The push bar 65 is slidably mounted on the shafts 66. The push bar 65 in its top edge in proximity to each end thereof is notched, as at 69, for a purpose to be referred to. The push bar 65 is substantially flush with the top edges of the frame 39. Each shaft 66 intermediate its ends thereof extends through the enlarged upper end 70 of vertically disposed spaced supports 71 which have their lower ends resiliently mounted as at 72. The end 70 of each support 71 has an opening 73 for the passage of a shaft 66. The end 70 of each support 71 carries spaced bearings 74. It is to be understood that since the shafts 66 extend for a considerable length across the road, these shafts, unless supported between their ends, would have too much downward flexing under the weight of a vehicle. The supports 71 are for the purpose of resisting this downward flexing and are supported on springs in order that the resistance may be accompanied by no injurious shock effects such as would be the case were the member 71 not spring supported.

Each shaft 66 is provided with a set of normally inactive latched stop elements, which function when latched as a traction surface for a vehicle and when released to prevent traction of the vehicle when the latter passes onto a controlling structure. The supports 71 extend between pairs of stop elements. The stop elements of each of said pairs of a set are designated at 75, 76 and the other stop elements of said set are indicated at 77. Each of the said stop elements includes a tubular body 78 formed of a central portion 79 and a pair of end portions 80, 81. The outer diameter of the body 78 increases from the center of said body toward the ends thereof. The inner diameter of the portions 80, 81 are uniform and are greater in diameter than the inner diameter of portion 79. The junctions of the inner diameters of the body 78 form the latter with internal shoulders 82. The inner diameter of portion 79 is greater than the diameter of shafts 66. The end portion 80 of each element 77 is formed with rounded sockets 83. The end portion 81 of each element 77 is formed with spaced protuberances 84. The end portion 80 of element 75, is to be formed with spaced sockets (not shown) for receiving the protuberances 84 of an element 77. The end portion 81 of the element 76 is formed with protuberances 85 for engagement in sockets 83 of an element 77.

Mounted on the shafts 66 and arranged in the end portions 80, 81 of the said elements 75, 76 and 77 are bearing devices 86. Arranged between the bearings 74 and bearing devices 86 in the end 81 of the element 75 and the end 80 of element 76 are controlling springs 87. Interposed between bearing device 86 are controlling springs 88. Springs 87, 88 encompass the shafts 66. The push bar 65 is formed with sockets 89 to receive the protuberances on an element 77. When the several protuberances are seated in the sockets, the elements 75, 76 are locked together and cannot revolve relative to shafts 66. The several protuberances and sockets are brought into engagement when the push bar 65 is shifted to the position shown in Figure 3, and when in such position the set of stop elements on each shaft 66 cannot turn or revolve relative to such shafts and further, when in such position a traction surface is formed. When the push bar 65 is in the position shown in Figure 4 each set of stop elements is released and the springs 87, 88 act to separate the stop elements whereby these latter can freely revolve relative to shafts 66 resulting in the preventing of traction to a vehicle, when mounted on a controlling structure. The push bar 65 is shifted to the position shown in Figure 3 when circuit 21 is closed. When push bar 65 is shifted to the position shown in Figure 3 it is latched in such position and the means for latching said bar will be presently referred to. Within the push bar 65 are bearings 90, each encircling a shaft 66 and positioned against the bearings 90 and encompassing shafts 66 are springs 91 which function in the same manner as the springs 87, 88.

The means for latching the push bar 65 in a position to provide for latching the stop elements in inter-engagement to prevent said stop elements revolving relative to the shaft 66 includes a pair of hook-shaped latching members 92 which extend through the notches 69. The latching members 92 are pivotally connected as at 93 to the inner faces of the front and rear of the frame 39. The latching members 92 move to latching position by gravity and have their bills 94 bear against one side of the push bar 65 in a manner as shown in Figure 6. The latching members 92 are vertically moved to released position by vertically movable lifting members 96 which are slidably connected to the inner faces of the front and rear of the frame 39. Superposed keepers 97 are employed for slidably connecting the members 96 to the front and rear of the frame 39. The upper ends of the members 96 are of yoke-shaped form as indicated at 98 and which straddle the shanks of the members 92 adjacent the pivots 93. The members 96 are arranged at the side of the push bar 65 oppositely to that side with which the bills 94 coact. The members 96 intermediate their ends are lengthwise toothed as at 99. Meshing with the toothed portions 99 of the members 96 are rotatable pinions 100 which act to elevate and lower the members 96 when said pinions are rotated. The pinions 100 are rotated in opposite directions, in one direction to elevate the members 96 and in the other direction to lower the members 96. The pinions 100 are secured to one end of the shafts 101 which extend through the partition 46 which are positioned below the racks 62. Connected to the partition 46 are oppositely extending brackets 102, 103 in which the shafts 101 are journaled. The other ends of the shafts 101 are provided with pinions 104, which mesh with the pinions 56. When shaft 52 is revolved in one direction the pinions 100 and 104 cause the elevating of the member 96 to release members 92. When the shaft 52 is operated in the other direction, the pinions 100 and 104 provide for the moving of the members 96 downwardly to permit the members 92 to move to latching position by gravity to push bar 65.

With reference to Figure 8 the modification disclosed thereby relates solely to the supporting shafts for the stop elements. The supporting shafts 66 are each formed of a continuous length of material, whereas the supporting shaft 105 shown in Figure 8 consists of a plurality of sections 106, 107 having coacting means as at 108 for connecting them together. The form of supporting shaft 105 provides for setting up a series of stop elements in groups, each group being carried by a section of shaft 105. The form of shaft 105 provides for its use with a frame of greater length than that of frame 39, or in other words, the supporting shaft 105 is formed of a plurality of sections having means for connecting them together, whereas the supporting shaft 66 is formed of a single length of material.

While, in the present drawings, the structure has been shown as extending along a not very great portion of the vehicle roadway, it will be obvious that the length of the structure is to be made sufficiently great that the inertia of the vehicle under running conditions will be overcome before the vehicle can pass off of the structure after running thereon. The present showing is not, therefore, intended to illustrate the exact proportions, especially as to length of the structure, but is merely illustrative of the means employed. Obviously, even with the proportions shown, a slow moving vehicle would not run off of the stop structure after passing thereon.

The pair of controlling structures employed at a crossing are released to perform their stopping function, one by a train traveling in one direction and the other by a train traveling in the other direction. The controlling structures are not simultaneously released because one is entirely independent of the other.

What I claim is:—

1. In a traction controlling structure for use relative to railroad crossings, a traction controlling structure adapted to be located in a roadway or street leading to the crossing and positioned adjacent to one side of the latter, said structure adapted to be traversed by the vehicle when traveling towards the crossing and including revolubly supported spring separable stop elements and a non-rotatable member, said elements and member being provided with coacting interlocking means, said elements being normally interlocked and said member being normally interlocked with one of said elements, said elements extending end to end transversely of the road on a horizontal axis, said elements providing when interlocked, a traction surface for the vehicle and when released for the independent revolving of said elements to prevent traction to the vehicle thereby stopping the latter, a mechanism shiftable in one direction to cause the interengaging and interlocking of said non-rotatable member and said elements and in the other direction to release said elements to permit their independent revolving, means under the control of a railroad train, when the latter approaches the crossing, for actuating the said mechanism in the said other direction to release said elements, and means under the control of the railroad train, after the latter passes the crossing, for operation of said mechanism in a direction to provide for the interengaging and latching of said elements, said traction-controlling structure being of such length as to materially reduce the speed of a vehicle moving thereon before reaching the exit end of the structure.

2. In a traction controlling structure for the purpose set forth, a traction controlling structure adapted to be traversed by a vehicle, said structure including a plurality of parallel sets of rotatable stop elements, each set consisting of a series of stop elements alined end to end on a horizontal axis across a road and capable of being bodily shifted horizontally in one direction to provide a traction surface and in the opposite direction to provide a non-traction surface, said elements being provided on their ends with coacting interlocking means normally holding the elements of the set against rotation with respect to each other, non-rotatable elements each aligned with a set of stop elements and having interlocking means coacting with the interlocking means of the stop element at one end of the series to hold the latter normally against rotation, and means operative in one direction for shifting said elements to and for latching them together in abutting relation to provide said traction surface for the vehicle and operative in the other direction for releasing said elements to permit the shifting of said elements from abutting relation to provide a non-traction surface for the vehicle thereby arresting the travel of the latter, said traction-controlling structure being of such length as to materially reduce the speed of a vehicle moving thereon before reaching the exit end of the structure.

3. The invention as set forth in claim 2 having a stationary shaft for each of said sets and upon which the elements of the sets are revolubly mounted, said traction-controlling structure being of such length as to materially reduce the speed of a vehicle moving thereon before reaching the exit end of the structure.

4. In a traction controlling structure for the purpose set forth, a traction controlling structure adapted to be traversed by a vehicle, said structure being of such length as to materially reduce the speed of a vehicle moving thereon before reaching the exit end of the structure, said structure including a plurality of parallel sets of rotatable stop elements each set consisting of a series of stop elements aligned end to end on a horizontal axis across a road, said elements being provided with coacting interlocking means normally holding the elements of a set against relative rotation, said elements being capable of being bodily shifted horizontally in one direction to provide a traction surface and in the opposite direction to provide a non-traction surface, non-rotatable elements each associated with a set of the stop elements and provided with interlocking means normally engaging with interlocking means of the stop element at one end of the series and operative in one direction for shifting said elements for interlocking them together in abutting relation to provide said traction surface for the vehicle and operative in the other direction for releasing said elements to permit the shifting of said elements from abutting relation to provide a non-traction surface for the vehicle thereby arresting the travel of the latter, a stationary shaft for each set of said sets and upon which the elements of the set are revolubly mounted, and separating springs between the elements of each of said sets.

5. In a traction controlling structure for the purpose set forth, a traction controlling structure adapted to be traversed by a vehicle, said structure including a plurality of parallel sets of stop elements, each set consisting of a series of stop elements alined end to end on a horizontal axis across a road and said elements being capable of being bodily shifted in one direction to provide a traction surface and in the opposite direction to provide a non-traction surface, means operative in one direction for shifting said elements to and for interlocking them together in abutting relation to provide said traction surface for the vehicle and operative in the other direction for releasing said elements to permit the shifting of said elements from abutting relation to provide a non-traction surface for the vehicle thereby arresting the travel of the latter, said elements being arranged in parallel sets, a stationary shaft for each set of said sets and upon which the elements of the set are revolubly mounted, separating springs between the elements of each of said sets, and the elements of each set being formed with coacting means to provide for their inter-engagement when the elements are shifted to interengaged position, said traction-controlling structure being of such length as to materially reduce the speed of a vehicle moving thereon before reaching the exit end of the structure.

6. In a traction controlling structure for the purpose set forth, parallel sets of revolubly supported stop elements for supporting a traveling vehicle, cooperative interlocking means on said stop elements normally holding the stop elements of each set from relative rotation, a non-rotatable element for each set, the rotatable elements and non-rotatable element of each set being aligned in the same horizontal plane transverse a roadway, each non-rotatable element and the adjacent aligned rotatable element having cooperating interlocking means normally holding the rotatable elements against rotation, a supporting shaft for each set of stop elements, supporting means for said shafts adapted to be located adjacent one side of a railroad crossing, means operable in one direction for urging said non-rotatable and stop elements into interlocking engagement whereby to convert the structure into a traction surface, said means being operable in the opposite direction to permit disengagement of said non-rotatable and stop elements whereby the structure has a non-traction surface, said oppositely actuatable means being mounted in said supporting means and including a part slidably mounted on said shafts to shift said stop elements to interlocked position, means controlled by a railroad train as it approaches said crossing to provide for the operation of said actuatable means in a direction to release said elements, and means controlled by the railroad train after it passes the crossing to provide for the operation of said actuatable means in the other direction for interlocking said stop elements, said traction-controlling structure being of such length as to materially reduce the speed of a vehicle moving thereon before reaching the exit end of the structure.

7. In a traction controlling structure for the purpose set forth, parallel sets of revolubly supported stop elements for supporting a traveling vehicle, cooperative interlocking means on said stop elements normally holding the stop elements of each set from relative rotation, non-rotatable element for each set, the rotatable elements and non-rotatable element of each set being aligned in the same horizontal plane transverse a roadway, each non-rotatable element and the adjacent aligned rotatable element having cooperating interlocking means normally holding the rotatable elements against rotation, a supporting shaft for each set of stop elements, supporting means for said shafts adapted to be located adjacent one side of a railroad crossing, means operable in one direction for urging said non-rotatable and stop elements into interlocking engagement whereby to convert the structure into a traction surface, said means being operable in the opposite direction to permit disengagement of said non-rotatable and stop elements whereby the structure has a non-traction surface, said oppositely actuatable means being mounted in said supporting means and including a part slidably mounted on said shafts to shift said stop elements to interlocked position, means controlled by a railroad train as it approaches said crossing to provide for the operation of said actuatable means in a direction to release said elements, means controlled by the railroad train after it passes the crossing to provide for the operation of said actuatable means in the other direction for interlocking said stop elements, and latching means for said slidably mounted part controlled from said actuatable means, said traction-controlling structure being of such length as to materially reduce the speed of a vehicle moving thereon before reaching the exit end of the structure.

WALKER COLEMAN GRAVES, Jr.